United States Patent Office 3,516,558
Patented June 23, 1970

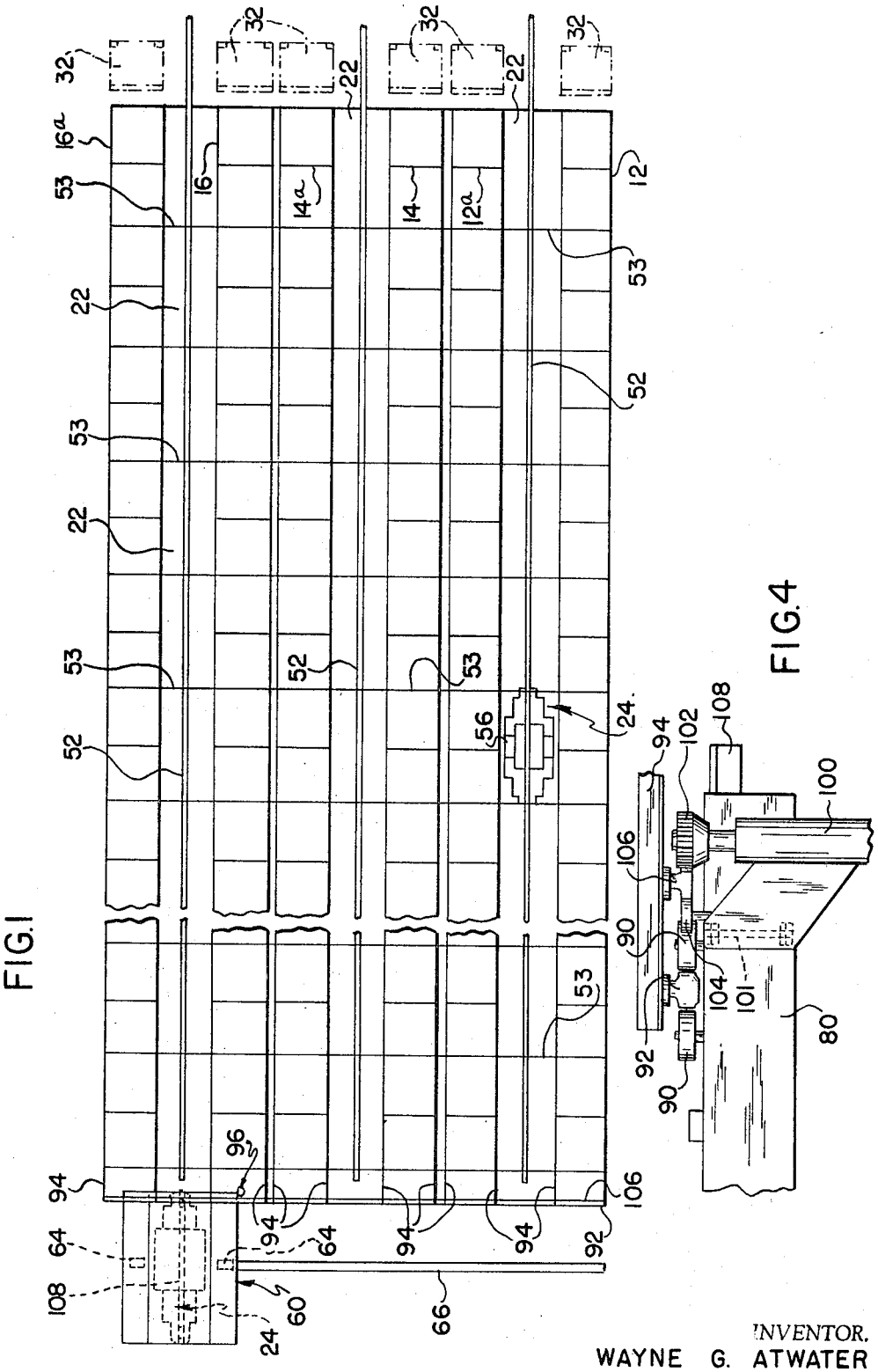

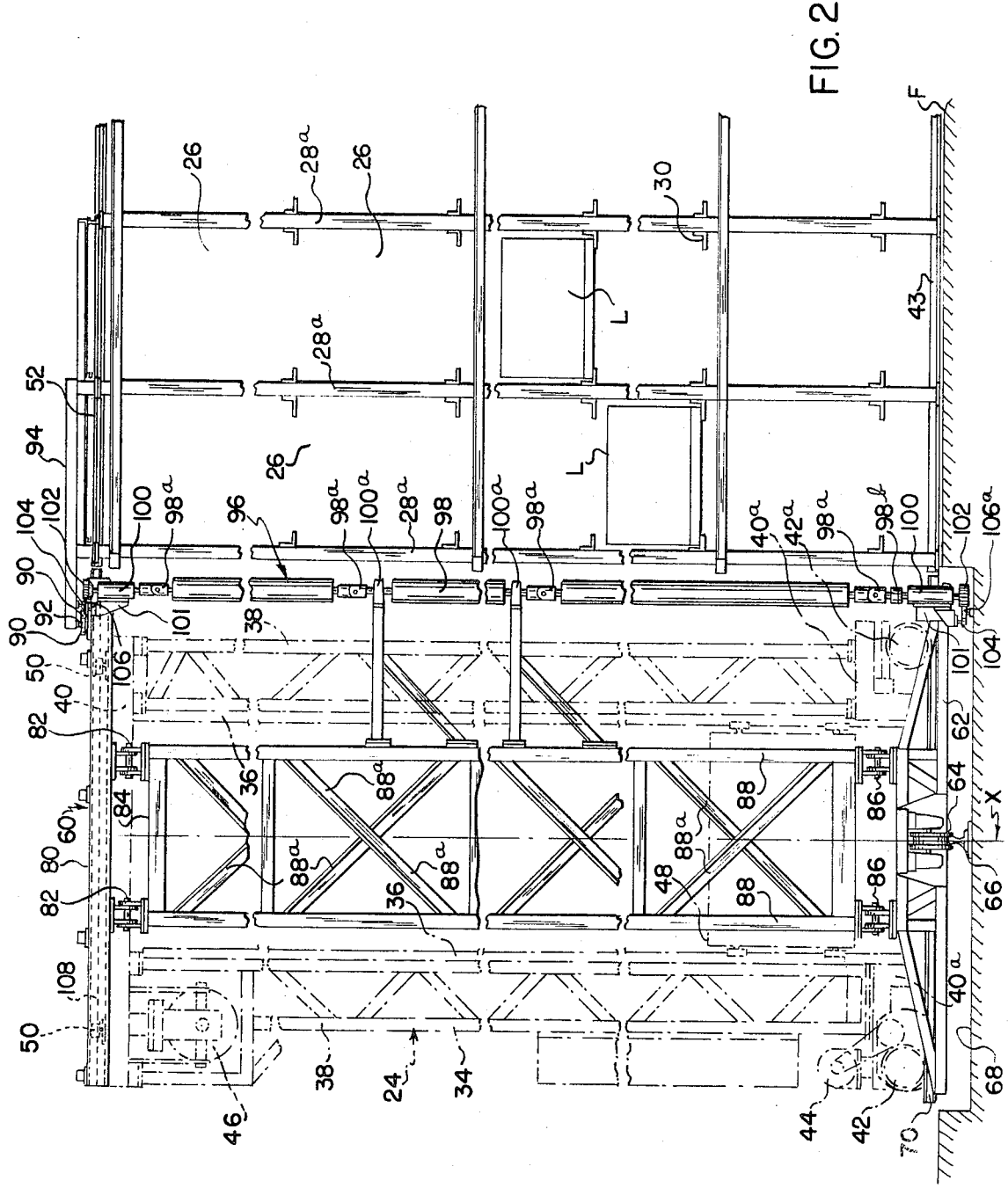

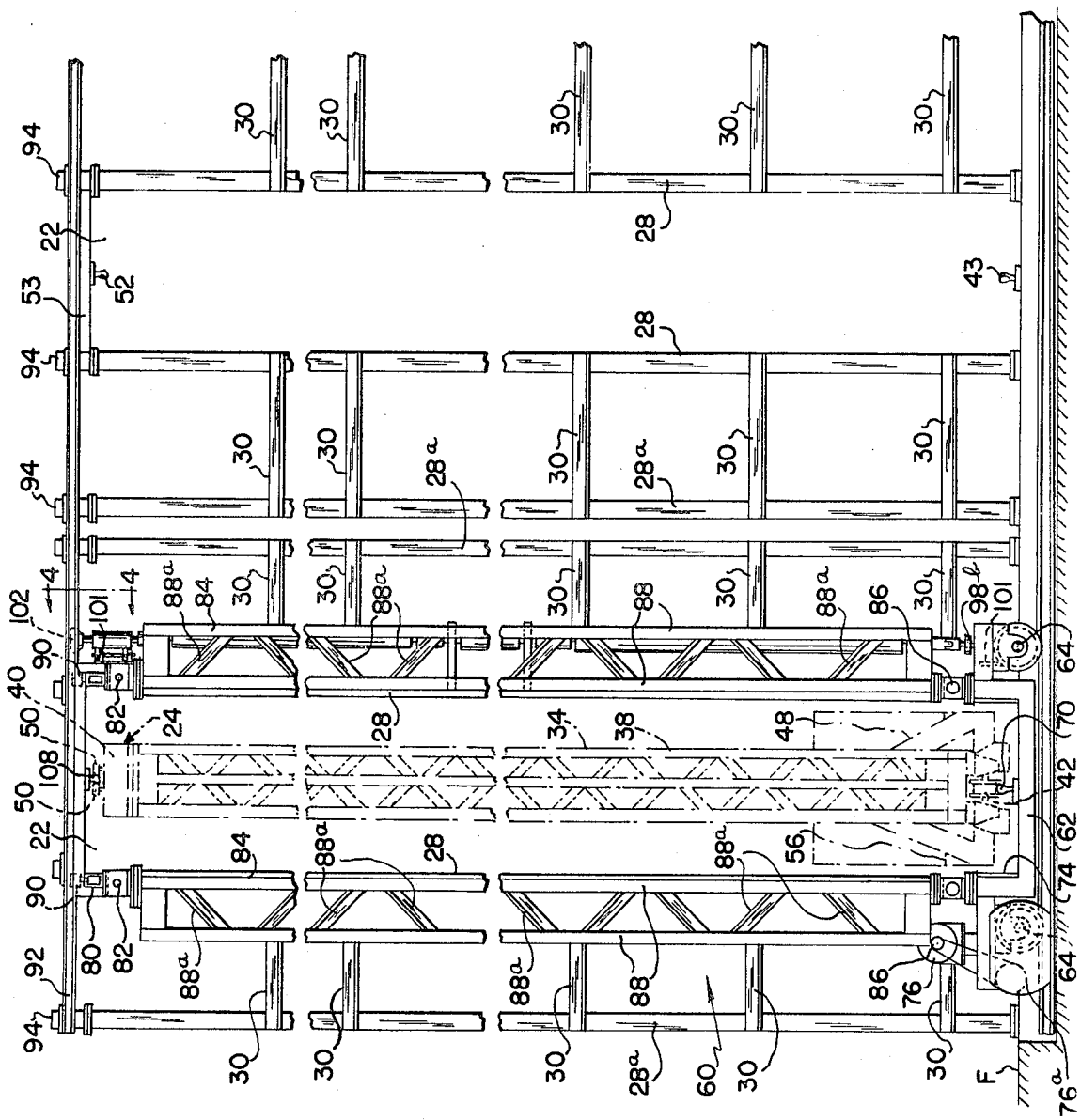

3,516,558
AUTOMATIC WAREHOUSING SYSTEM WITH
TRANSFER MECHANISM
Wayne G. Atwater, Willoughby, Ohio, assignor to The
Triax Company, Cleveland, Ohio, a corporation of Ohio
Filed Sept. 3, 1968, Ser. No. 756,893
Int. Cl. B65g 1/00
U.S. Cl. 214—16.4        17 Claims

ABSTRACT OF THE DISCLOSURE

An automatic warehousing system comprising a plurality of storage bay sections and a plurality of separated travel zones along which are disposed the storage bay sections, and with a load carrier which is adapted to move in the travel zones for depositing loads into or removing loads from load storage locations in the storage sections. A mobile transfer mechanism is provided for receiving the load carrier thereon and transferring the load carrier from one travel zone to another travel zone, thereby enabling the load carrier to move in more than one travel zone and service the storage sections disposed along the plurality of travel zones.

This invention relates in general to automatic warehousing systems for storing and unstoring loads by transferring them between a powered load carrier and a storage structure or storage frame, and more particularly relates to a warehousing system comprised of a plurality of storage sections with a plurality of separate travel zones extending alongside the storage sections and with the load carrier being adapted to move in said plurality of travel zones and with a transfer mechanism adapted to receive the load carrier thereon in supported relationship for transferring the load carrier from one travel zone to another travel zone.

It is known in the automatic warehousing art to provide a warehousintg system which includes a plurality of separate travel zones and with a powered load carrier and transferring mechanism for transferring the load carrier from one travel zone to another travel zone, thus enabling the load carrier to operate in a plurality of travel zones and thus service a considerable number of storage sections.

The present invention provides a warehousing system of the above discussed type with a novel load carrier transferring mechanism for moving the load carrier from one travel zone to another travel zone. The load carrier transfer mechanism is supported entirely by the floor of the warehousing system with none of the weight thereof being carried by the storage structure, and with the load carrier transfer mechanism being mounted on floor mounted rail means extending in a direction generally perpendicular to the lengthwise direction of extension of the travel zones and with coupling means coacting with the upper portion of the transfer mechanism to restrict lateral movement of the upper portion with respect to the storage structure and maintain the transfer mechanism generally vertically oriented during movement of the transfer mechanism on the rail means.

Accordingly, it is an object of the present invention to provide an automatic warehousing system embodying a novel arrangement of load carrier transferring mechanism.

Another object of the invention is to provide a warehousing system of the above discussed type wherein the load carrier transfer mechanism comprises a lower power driven carriage section supported generally centrally thereof on a single floor mounted rail extending in a direction generally perpendicular to the direction of extension of the travel zones, and with the transfer mechanism including an upper frame section with vertically elongated connecting means extending between the upper frame section and the lower carriage section and supporting the upper frame section on the lower carriage section, whereby the complete weight of the transfer mechanism is supported on the single floor mounted rail.

A still further object of the invention is to provide a warehousing system in accordance with the above wherein the connecting means are pivoted to the upper frame section and to the lower carriage section and wherein rotatable squaring means coacts between the upper frame section and the lower carriage section for causing simultaneous synchronized movement of the upper frame section with the lower carriage section upon driving of the lower carriage section on the supporting floor mounted rail.

A still further object of the invention is to provide a warehousing system in accordance with the above wherein the squaring means for maintaining the upper frame section and lower carriage section in alignment during movement of the transfer mechanism comprises a vertically oriented shaft means adapted for rotation about a generally vertical axis and with gear means of identical size and number of teeth mounted adjacent opposite ends of said shaft means and with gear racks extending in a direction generally perpendicular to the direction of extension of said travel zones being mounted adjacent the upper and lower gear means, and with the gear means coacting in meshing relationship with the racks, so that upon driving of the lower carriage section, the upper frame section is moved in synchronism with the lower carriage section.

Other objects and advantages of the invention will be apparent from the following description taken in conjunction with the accompanying drawings, wherein:

FIG. 1 is a top plan, broken, generally diagrammatic illustration of a warehousing system embodying the present invention;

FIG. 2 is an enlarged, broken, end elevational view of the powered transfer mechanism for transferring the load carrier (shown in phantom lines on the transfer mechanism) from one travel zone of the warehousing system to another travel zone, for servicing by the load carrier the storage frame sections associated with the plural travel zones;

FIG. 3 is a rear end elevational view of the FIG. 2 illustration, with the transfer mechanism being in a position of alignment with a travel zone, so that the load carrier (shown in phantom lines) is aligned with the supporting and guiding rails of the associated storage frame sections, for movement of the load carrier into the confronting travel zone; and FIG. 4 is a fragmentary illustration of the upper portion of the squaring mechanism for the upper and lower sections of the transfer mechanism and is taken generally along the plane of line 4—4 of FIG. 3.

Referring now again to the drawings, the warehousing system may comprise a plurality of generally parallel storage bay sections 12, 12a, 14, 14a, 16, 16a, etc. defining between each pair thereof an aisle or travel zone 22 so as to permit a motorized load carrier, indicated generally at 24, to be moved along the aisle or travel zone to insert loads into and/or withdraw loads from the load support means or storage bins 26 formed by the storage sections 12 thru 16a.

Each storage section may be constructed of a plurality of vertically extending laterally spaced posts 28, 28a spaced apart by a plurality of generally horizontally extending load supporting rails 30, defining in conjunction with the posts 28, 28a, a plurality of the aforementioned storage bins. Pairs of said load supports 30 are adapted to receive loads L thereon in bridging relation (FIG. 2) and support the loads in the storage sections. The storage frame construction per se may be generally similar to that disclosed in assignee's U.S. Pat. No. 3,371,804, dated Mar. 5, 1968 in the name of Anthony R. Chasar, and entitled Automatic Warehousing System and reference may be had thereto for a more detailed discussion of structural details of suitable warehousing storage frame construction.

Disposed at one end of preferably each of the storage sections 12 thru 16a there may be provided a pickup and discharge station 32, which is adapted for receiving a load to be handled by the load carrier 24, prior to moving such load into the travel zone or aisle 22 by the load carrier, and for receiving a load from the load carrier after a load has been removed from a selected bin by the load carrier and return to the pickup and discharge station. The load carrier may also pickup a load in one storage section and transfer it to another storage bin in the same storage section or to a bin in a different storage section.

The load carrier 24 may comprise a longitudinally movable vertically elongated conveyor frame portion 34 including generally upright mast structure formed by a pair of generally vertically extending track members 36 (FIG. 2) which may be reinforced by means of associated truss structure 38, suitably coupled to the respective track member 36. The mast structure and reinforcing truss structure extend between the upper and lower sections 40, 40a of the load carrier and are secured thereto preferably in generally rigid relationship.

The lower load carrier section 40a in the embodiment illustrated comprises a generally U-shaped, in side elevation, (FIG. 2) frame supported on flanged wheels 42, 42a which in turn are adapted to ride on a rail member 43 extending lengthwise of each of the travel zones 22 and mounted, in the embodiment illustrated, on the floor F of the storage complex. The lower carriage section 40a of the load carrier may be driven by means of a preferably reversible electric motor 44 (FIG. 2) mounted on the carriage frame 40a and operatively coupled to the wheel 42, for driving the load carrier along the respective rail 43.

Upper frame section 40 of the load carrier may include a generally rectangular frame supporting a preferably reversible electric motor 46 (FIG. 2) operably coupled to elevator portion 48 of the load carrier, for moving the elevator portion 48 vertically on the mast tracks 36. The upper frame section 40 of the load carrier preferably has laterally spaced rollers 50 rotatably mounted theeron, which rollers coact in rolling engagement with upper rail member 52 running lengthwise of each of the aisles or travel zones 22 of the warehousing system, with the rails 52 being supported on the storage structure by any suitable means, as for instance by the cross elements 53 which join together opposing storage sections. Rollers 50 guide the upper end of the load carrier in its longitudinal movement lengthwise of the respective aisle or travel zone.

Mounted generally centrally on the elevator 48 may be an extractor portion 56 (FIG. 3) which is adapted to move laterally of the elevator with a load supported thereon and deposit the load in a selected storage bin of the associated storage section, or to move laterally of the elevator and pickup a load that is already in the associated storage section and move it back to the desired pickup and discharge station. The extractor 56 preferably provides an extendible table, with the table being extendible in either of the opposed directions transverse to the longitudinal direction of movement of the load carrier in a travel zone, so as to locate the extractor within either of the storage sections associated with each travel zone, effective to place the table in position to deposit a load into or remove a load from a selected storage bin in the selected storage section. Suitable power means such as a reversible electric motor (not shown) may be provided operatively coupled to the extractor for actuating the latter. Reference may be had to the aforementioned U.S. Pat. No. 3,371,804 for a more detailed disclosure of suitable extendible extractor mechanism.

The programmed operation of the load handling cycle for the load carrier may be controlled by an electrical control circuit as disclosed for instance in the copending U.S. patent application, Ser. No. 418,048 of Sanford Saul, filed Dec. 14, 1964 and entitled Electrical Control Circuit for an Automatic Warehousing System. For example, with the load carrier disposed at a pickup and discharge station in the system, the load carrier may be automatically moved into the selected aisle or travel zone and located sequentially opposite two storage bins in either of the associated storage sections or in the same storage section. At each storage bin during the control interval, the extractor may be actuated so that a load will be deposited into or withdrawn from the confronting bin. For example, a load may be deposited into the selected bin at the first position and a second load withdrawn from a selected bin at the second position, and then conveyed back to aforementioned pickup and discharge station; or the handling cycle may conclude after the load handling at the first position in the system. The load carrier may be programmed form a control panel mounted on the load carrier, or it may be programmed from a location remote from the load carrier such as for instance, by a computer or the like, for controlling the positioning of the load carrier in the warehousing system.

Transfer mechanism 60 is provided for transferring the load carrier unit 24 from one travel zone and the storage sections associated with that travel zone to another travel zone, whereby the load carrier can be expeditiously operated in more than one travel zone and thus service a considerable number of aisles and associated storage sections in the warehousing system. Such transfer mechanism comprises a lower mobile carriage 62 which has spaced flanged wheels 64 rotatably mounted thereon generally centrally of the carriage and disposed in the longitudinal vertical center plane X of the transfer mechanism, as can be seen from FIG. 2. Wheels 64 are adapted to roll on a single rail member 66 disposed in recess portion 68 of floor F of the warehousing system. Rail 66 extends in a direction generally perpendicular to the direction of lengthwise extension of the travel zones 22, and provides for movement of the transfer mechanism from confronting relation to one travel zone into confronting relation with another travel zone in the transfer mechanism's operation of transferring a load carrier from one travel zone to another travel zone.

Lower carriage section 62 of the transfer mechanism has a rail section 70 generally centrally mounted thereon and extending transverse of the longitudinal direction of movement of the transfer mechanism, which rail section receives the load carrier wheels 42, 42a thereon when the load carrier is moved onto the transfer mechanism, and supports the load carrier on the transfer mechanism. In the embodiment illustrated, the carriage 62 of the transfer mechanism is of generally U-shaped configuration in side elevation (FIG. 3) providing a well 74 for receiving the load carrier. Suitable power means is provided such as for instance a reversible electric motor 76 operatively coupled to a geared speed reducer means 76a which in turn may be coupled to at least one of the wheels 64 of the transfer mechanism, for causing powered rotation of the wheel and thus driving movement of the transfer mechanism along the single rail 66. When the transfer mechanism is aligned with a selected storage aisle or travel zone, the rail section 70 on the lower carriage section 62 of the transfer mechanism is aligned with the rail member 43 in the respective storage aisle, thereby making it possible to readily move the load carrier onto and off of the transfer mechanism.

Transfer mechanism 60 also includes upper frame or section 80 which may be of generally rectangular configuration in top plan, with the frame being pivotally connected as at 82 by laterally spaced horizontally oriented pivots to spaced vertically elongated connecting members or struts 84 which in turn are pivotally connected by laterally spaced horizontally oriented pivots 86 to the lower carriage section 62 of the transferring mechanism. As can be seen from FIG. 2, the pivots 82, 86 for each connecting member 84 are disposed on opposite sides of the longitudinal vertical center plane X of the transfer mechanism and at equal distance from such plane.

Connecting members 84 in the embodiment illustrated, are of truss construction comprising vertical corner posts 88 and connecting cross elements 88a. As can be seen in FIG. 2, each strut element 84 is of a substantial width resulting in the post elements 88 and pivots 82, 86 being spaced a substantial distance from the longitudinal vertical center plane X of the transfer mechanism, and with the width (FIG. 2) of each strut element 84 being substantially greater than the depth (FIG. 3) thereof. It will be seen that connecting strut elements 84 are adapted for pivotal movement with repsect to upper and lower transfer sections 80, 62 in generally vertical planes running parallel to the longitudinal vertical center plane of the transferring mechanism, but are not adapted to pivot in vertical planes running generally perpendicular to the longitudinal vertical center plane X of the transfer mechanism.

Referring now to FIGS. 2 and 4, frame 80 has pairs of laterally spaced rollers 90 rotatably mounted thereon about generally vertical axes, with the rollers adapted for rolling coaction with rail or track member 92 suspended from the underside of overhang portions 94 of the storage structure. It will be seen that while track 92 and coacting rollers 90 guide the lengthwise movement of the transfer mechanism on track 66 and couple the upper end of the transfer mechanism to the storage structure, that track 92 does not support any of the weight of the upper frame section 80 and therefore the latter is supported completely on the connecting strut elements 84 which in turn transmit the weight of the upper frame 80 to the lower carriage section 62 of the transfer mechanism.

Extending between the upper frame 80 and the lower carriage 62 is squaring mechanism 96 (FIG. 2) for maintaining the upper frame 80 in synchronism with the lower carriage 62 during driving movement of the lower carriage along track 66, thus assuring that the connecting strut elements 84 are maintained in generally vertical condition as the transfer mechanism moves to transfer a load carrier unit from one travel zone to another travel zone. In the embodiment illustrated, the squaring means 96 comprises a shaft assembly 98 which preferably includes universal joint means 98a and angular adjustment coupling means 98b, with the shaft assembly being rotatably mounted in vertically spaced bearing means 100, 100a attached to the upper frame 80, the connecting strut elements 84 and the lower carriage 62. Bearing means 100 are preferably pivoted to the upper frame section and lower carriage section as at 101. Gears 102 are secured to the shaft assembly adjacent opposite ends of the latter (FIG. 2) with the gears being of the same size and number of teeth. Also rotatably mounted on each upper and lower bearing member 100 may be an idler roller member 104 (FIG. 4). Each of the gears 102 are adapted for meshing coaction with an association gear rack 106, 106a extending along the path of travel of the transfer mechanism adjacent the upper and lower ends thereof. Upper gear rack 106 may be secured to the underside of overhang portions 94 while lower gear rack 106 may be secured to the floor in pit 68. The respective idler roller 104 is adapted to engage the back or smooth side of the respective gear rack and thus intercouple the gears 102 to the respective gear rack.

It will be seen that during movement of the transfer mechanism along its supporting rail 66, gear 102 on the lower end of the squaring shaft will be caused to rotate thus rotating the squaring shaft assembly and causing rotation of gear 102 on the upper end of the squaring assembly. Since the gears are of the same size and the same number of teeth, rotation of the squaring shaft assembly will maintain the upper frame 80 and lower carriage 62 in synchronism.

Upper frame section 80 also has a rail section 108 (FIGS. 3 and 4) mounted on the underside thereof at a level co-planar with the aforementioned upper rails 52 in each aisle 22, so that when a load carrier is mounted on the transfer mechanism, the rollers 50 on upper frame 40 of the load carrier coact with rail section 108 and prevent lateral tipping of the load carrier. When the transfer mechanism is carrying a load carrier unit and has been aligned with the selected storage zone, rail section 108 on the transfer mechanism is in alignment with the rail 52 in the aisle, so that the load carrier may be expeditiously moved from the transfer mechanism onto lower rail 43 in the selected aisle.

From the foregoing discussion and accompanying drawings it will be seen that the invention provides a warehousing system comprising a plurality of travel zones and a storage structure in which loads are adapted to be stored by means of a mechanized load carrier mechanism adapted for movement in the travel zones, together with a load transfer mechanism for moving the load carrier from one travel zone into alignment with another travel zone, and with the transfer mechanism comprising a novel arrangement of lower carriage movable on floor mounted track and with the transfer mechanism including an upper frame section coupled to the lower carriage by means of vertically elongated connecting strut members whereby the weight of the upper section and connecting strut members is supported by the lower carriage on the track. The invention also provides a warehousing system of the latter described type wherein the upper frame section is movably coupled to the storage structure and wherein the connecting strut elements are pivoted to the upper frame section and to the lower carriage section and including squaring means for maintaining the upper section synchronized with the lower carriage section during powered movement of the lower carriage section along the floor mounted supporting track for the transfer mechanism.

The terms and expressions which have been used are used as terms of description and not of limitation, and there is no intention in the use of such terms and expressions of excluding any equivalents of any of the features shown or described or portions thereof.

What is claimed is:

1. In a warehousing system comprising in combination storage means adapted for storing loads thereon, a plurality of spaced travel zones along which are disposed the storage means, at least one vertically elongated load carrier adapted for movement in said travel zones for depositing loads itno and removing loads from the associated storage means, and means for transferring said load carrier from one travel zone to another of said travel zones, said transfer means comprising a longitudinally movable lower carriage section and an upper section, vertically elongated connecting means extending between said upper and lower sections and mounting said upper section on said lower section whereby substantially the total weight of said upper section is supported by said lower section, said load carrier being adapted to be received on said transfer means between said upper and lower sections for transferring said load carrier from one travel zone means on said upper section adapted for coaction with said load carrier for stabilizing the load carrier on said transfer means, to another travel zone, said lower carriage section including traction means thereon disposed substantially centrally thereof with respect to the longitudinally vertical center plane of said transfer means, and track means extending longitudinally generally perpendicular to the lengthwise direction of extension of said travel zones, coacting with said traction means for supporting said transfer means on said track means and providing for said longitudinal transferring movement thereof.

2. A system in accordance with claim 1 including coupling means coacting with said upper section for restricting lateral movement of said transfer means with respect to said storage means while providing for said longitudinal movement of said transfer means with respect to said storage means.

3. A system in accordance with claim 2 wherein said coupling means comprises spaced rollers on said upper section coacting with the sides of a longitudinally extending upper track on said storage means, said upper track being adjacent one end of said storage means and in a position intermediate said rollers.

4. A system in accordance with claim 2, wherein each of said travel zones has respective rail means extending lengthwise thereof for supporting said load carrier thereon in its movement in the respective travel zone, and said transfer means including rail means extending generally transversely thereof and adapted to support said load carrier thereon when said load carrier is positioned on said transfer means for movement from one travel zone to another travel zone, said rail means on said transfer means being adapted for alignment in a lengthwise direction with said rail means of the selected travel zone when said transfer means moves into confronting aligned relation with the selected travel zone for ready movement of said load carrier from said transfer means onto said rail means of the selected travel zone.

5. A system in accordance with claim 4 wherein said rail means of each travel zone comprises an upper rail member supported on said storage means generally centrally of the respective travel zone, and a lower rail member supported on the floor of said system generally centrally of the respective travel zone, said rail means of said transfer means comprising an upper rail member supported in depending relation from said upper section and a lower rail member mounted on said lower carriage section in generally vertical alignment with the last mentioned upper rail member, said upper rail member comprising said means on said upper section adapted for coaction with said load carrier, and said load carrier comprising means disposed adjacent the upper and lower ends thereof adapted for coaction with said rail members for supporting and guiding the movement of said load carrier in said travel zones and onto and from said transfer means.

6. A system in accordance with claim 5 wherein said load carrier comprises a vertically elongated conveyor portion, an elevator portion movable vertically on said conveyor portion to the selected level of said storage means, and an extractor portion mounted on said elevator portion and adapted for lateral movement with respect to said elevator portion for handling a load at the selected storage location.

7. A system in accordance with claim 1 wherein said track means comprises a single track member running generally perpendicular to the lengthwise direction of extension of said travel zones and disposed in the longitudinal vertical center plane of said transfer means, said traction means comprising longitudinally spaced wheels disposed in said longitudinal vertical center plane and engaging said track member for supporting said transfer means on said track member.

8. A warehousing system in accordance with claim 1 including means coacting with said connecting means to couple the latter to respectively said upper and said lower sections, and squaring means extending between said upper and lower sections for maintaining said sections in synchronism with one another during powered movement of said lower carriage section to cause said longitudinal movement of said transfer means.

9. A system in accordance with claim 8, wherein said squaring means comprises shaft means rotatable about a generally vertical axis, means rotatably mounting said shaft means on said upper section and said lower section, gear means secured adjacent opposite ends of said shaft means, and fixed rack means coacting with respectively the upper and lower gear means for causing concurrent longitudinal movement of said upper section with said lower section upon powered driving of said lower section.

10. A system in accordance with claim 8, wherein said means coacting with said connecting means includes horizontally oriented pivot means, said connecting means comprises longitudinally spaced truss members, said pivot means comprising transversely spaced pivotal connections for each of said truss members and said pivotal connections being disposed on opposite sides of the longitudinal vertical center plane of said transfer means.

11. A system in accordance with claim 9, wherein said storage means includes outwardly projecting upper overhang supports adjacent one end of said storage means, and guide means mounted on the underside of said overhang supports and extending longitudinally parallel to said track means, and roller means rotatably mounted on said upper section and coacting with said guide means for coupling said upper section to said storage means and restricting lateral movement of said transfer means with respect to said storage means while providing for said longitudinal movement of said transfer means with respect to said storage means.

12. A system in accordance with claim 9, wherein said lower carriage section is of generally U-shaped configuration in side elevation and includes an elongated transversely extending rail section thereon disposed generally centrally thereof and projecting in the general direction of lengthwise extension of said travel zones, and on which said load carrier is adapted to be supported during transferring movement by said transfer means from one travel zone to another travel zone.

13. A system in accordance with claim 9, including rail means in each of said travel zones for supporting and guiding the movements of said load carrier along the respective travel zone, said rail means in each travel zone comprising upper and lower rails extending lengthwise of the respective travel zone and between which said load carrier unit is adapted to extend, and each of said upper and lower transfer sections having a rail thereon extending transverse of the respective section and adapted for supporting and guiding said load carrier when said load carrier is mounted on said transfer means, the last mentioned rails being adapted for alignment in closely oriented condition with the respective upper and lower rails in a selected travel zone for ready movement of said load carrier onto and from said transfer means out of and into said selected travel zone the rail on said upper transfer section comprising said means on said upper section adapted for coaction with the load carrier.

14. A system in accordance with claim 13, wherein said upper section comprises a generally horizontally oriented frame and said lower section comprises a generally U-shaped in side elevation frame, said connecting means comprising longitudinally spaced aligned struts pivoted at two laterally disposed locations adjacent each end thereof to said upper and lower sections, said pivotal locations of each end of each strut being disposed on opposite sides of said longitudinal vertical center plane at an equal distance from said plane, said track means comprising a single horizontal track member running generally perpendicular to the lengthwise direction of extension of said travel zones, said traction means comprising longitudinally spaced wheels disposed for rotation in said longitudinal vertical center plane and engaging said track member for centrally supporting said transfer means on said track member, coupling means coacting with said upper section for restricting lateral movement of said transfer means with respect to said storage means while providing for said longitudinal movement of said transfer means with respect to said storage means, and wherein the width of each of said struts as measured in a direction transverse of said transfer means is of a considerably greater dimenion as compared to the depth of the respective strut as measured in the direction of extension of said track member.

15. In a warehousing system comprising in combination storage means adapted for storing loads thereon, a plurality of spaced travel zones along which are disposed the storage means, at least one vertically elongated load carrier adapted for movement in said travel zones fon depositing loads into and removing loads from the associated storage means, and means for transferring said load carrier from one travel zone to another of said travel zones, said transfer means comprising a longitudinally movable lower carriage section and an upper section, vertically elongated connecting means extending between said upper and lower sections and mounting said upper section on said lower section whereby substantially the toltal weight of said upper section is supported by said lower section, said load carrier being adapted to be received on said transfer means between said upper and lower sections for transferring said load carrier from one travel zone to another travel zone, means on said upper section adapted for coaction with said load carrier for stabilizing said load carrier on said transfer means, said lower carriage section including traction means thereon, track means extending longitudinally generally perpendicular to the lengthwise direction of extension of said travel zones and coacting with said traction means, for supporting said transfer means on said track means and providing for said longitudinal transferring movement thereof, and means restricting lateral movement of said transfer means with respect to said storage means and maintaining said transfer means in supported relation on said track means.

16. A system in accordance with claim 15 including motor means operatively coupled to said traction means for driving said transfer means on said track means.

17. A system in accordance with claim 16, wherein said track means comprises a single track member disposed in the longitudinal vertical center plane of said transfer means and said traction means comprises longitudinally spaced wheels disposed in said longitudinal vertical center plane.

References Cited

UNITED STATES PATENTS

| 3,432,046 | 3/1969 | Krusinski | 214—16.4 |
| 3,455,009 | 5/1969 | Burch | 214—16.4 |

FOREIGN PATENTS 1,317,172  12/1962  France.

GERALD M. FORLENZA, Primary Examiner

RAYMOND B. JOHNSON, Assistant Examiner

U.S. Cl. X.R.

104—48